(12) United States Patent
Kenig et al.

(10) Patent No.: US 10,498,610 B1
(45) Date of Patent: Dec. 3, 2019

(54) SYSTEM, METHOD, AND COMPUTER PROGRAM FOR UTILIZING RADIO ACCESS NETWORK (RAN) INFORMATION AND MOBILE BACKHAUL (MBH) NETWORK INFORMATION TO ASSESS NETWORK SITE PERFORMANCE

(71) Applicant: Amdocs Development Limited, Limassol (CY)

(72) Inventors: Ronen Kenig, Hod Hasharon (IL); Gautam Gupta, Ashburn, VA (US); Krishnan Venkataraghavan, Chennai (IN); Shekhar Rana, Baghpat District (IN); Alok Kumar Sinha, New Delhi (IN); Manish Kumar Sharma, Faridabad (IN); Yaron Kadmon, Klar Saba (IL); Yigal Bazak, Givat Shmuel (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 66 days.

(21) Appl. No.: 15/647,101

(22) Filed: Jul. 11, 2017

(51) Int. Cl.
  *H04L 12/24* (2006.01)
  *H04L 12/26* (2006.01)

(52) U.S. Cl.
  CPC .......... *H04L 41/5035* (2013.01); *H04L 43/04* (2013.01); *H04L 43/065* (2013.01)

(58) Field of Classification Search
  CPC ... H04L 41/5035; H04L 43/04; H04L 43/065; H04L 43/06; H04L 5/005; H04L 43/0805; H04W 24/08; H04W 36/0022; H04W 36/22; H04W 24/04; H04B 17/10
  See application file for complete search history.

(56) References Cited

U.S. PATENT DOCUMENTS

| | | | |
|---|---|---|---|
| 6,012,152 A * | 1/2000 | Douik | G06F 11/0709 714/26 |
| 8,170,544 B1 * | 5/2012 | Satapathy | H04W 24/08 455/423 |
| 8,923,134 B2 * | 12/2014 | Meredith | H04W 16/18 370/241 |
| 9,532,252 B2 | 12/2016 | Hariharan et al. | |
| 9,814,044 B1 * | 11/2017 | Sevindik | H04W 16/04 |

(Continued)

FOREIGN PATENT DOCUMENTS

WO  2008005369 A2  1/2008

*Primary Examiner* — Michael Thier
*Assistant Examiner* — Nevena Zecevic Sandhu
(74) *Attorney, Agent, or Firm* — Zilka-Kotab, P.C.

(57) ABSTRACT

A system, method, and computer program product are provided for utilizing radio access network (RAN) information and mobile backhaul (MBH) network information to assess network site performance. In operation, a system receives information associated with a radio access network. Additionally, the system receives information associated with a mobile backhaul network corresponding to the radio access network. The system correlates the information associated with the radio access network with the information associated with the mobile backhaul network to create correlated information. Further, the system calculates scores for the correlated information. Moreover, the system calculates a score for a site associated with the mobile backhaul network utilizing the scores for the correlated information.

17 Claims, 5 Drawing Sheets

(56) References Cited

U.S. PATENT DOCUMENTS

| | | | |
|---|---|---|---|
| 2013/0070743 A1* | 3/2013 | Picker | H04W 28/0247 370/338 |
| 2014/0185580 A1* | 7/2014 | Fang | H04W 16/14 370/330 |
| 2015/0056995 A1* | 2/2015 | Baillargeon | H04W 36/0022 455/436 |
| 2016/0043814 A1* | 2/2016 | Bishop | H04W 24/00 370/242 |
| 2016/0165461 A1* | 6/2016 | Kaul | H04W 24/02 370/217 |
| 2016/0242068 A1 | 8/2016 | Forsman et al. | |
| 2017/0019811 A1 | 1/2017 | Parulkar | |
| 2018/0176803 A1* | 6/2018 | Lee | H04W 24/08 |

\* cited by examiner

SYSTEM, METHOD, AND COMPUTER PROGRAM FOR UTILIZING RADIO ACCESS NETWORK (RAN) INFORMATION AND MOBILE BACKHAUL (MBH) NETWORK INFORMATION TO ASSESS NETWORK SITE PERFORMANCE

FIELD OF THE INVENTION

The present invention relates to assessing and ranking network site performance, and more particularly to utilizing radio access network (RAN) information and mobile backhaul (MBH) network information to assess and rank network site performance.

BACKGROUND

Service providers have experienced an exponential growth in mobile packet data traffic in the last decade, especially since the deployment of LTE and LTE-A. While radio access networks adopt new technologies such as 4G and 5G and scale to deliver the ever-increasing capacity and throughput demand, service providers cannot afford to allow the mobile backhaul (MBH) network to fall behind.

In a cellular network, the radio access network performance is often impacted by degradations in the mobile backhaul network, which impacts the overall end user experience. A quick identification and resolution of mobile backhaul issues can ensure minimal service impact and makes it possible to prevent severe impacts on end user experience. Currently, there is not an efficient mechanism to enable service providers that have radio access networks and mobile backhaul networks to quickly identify whether an issue is across the radio access network or the mobile backhaul network domains.

There is thus a need for addressing these and/or other issues associated with the prior art.

SUMMARY

A system, method, and computer program product are provided for utilizing radio access network (RAN) information and mobile backhaul (MBH) network information to assess network site performance. In operation, a system receives information associated with a radio access network. Additionally, the system receives information associated with a mobile backhaul network corresponding to the radio access network. The system correlates the information associated with the radio access network with the information associated with the mobile backhaul network to create correlated information. Further, the system calculates scores for the correlated information. Moreover, the system calculates a score for a site associated with the mobile backhaul network utilizing the scores for the correlated information.

DETAILED DESCRIPTION

Figure 1:
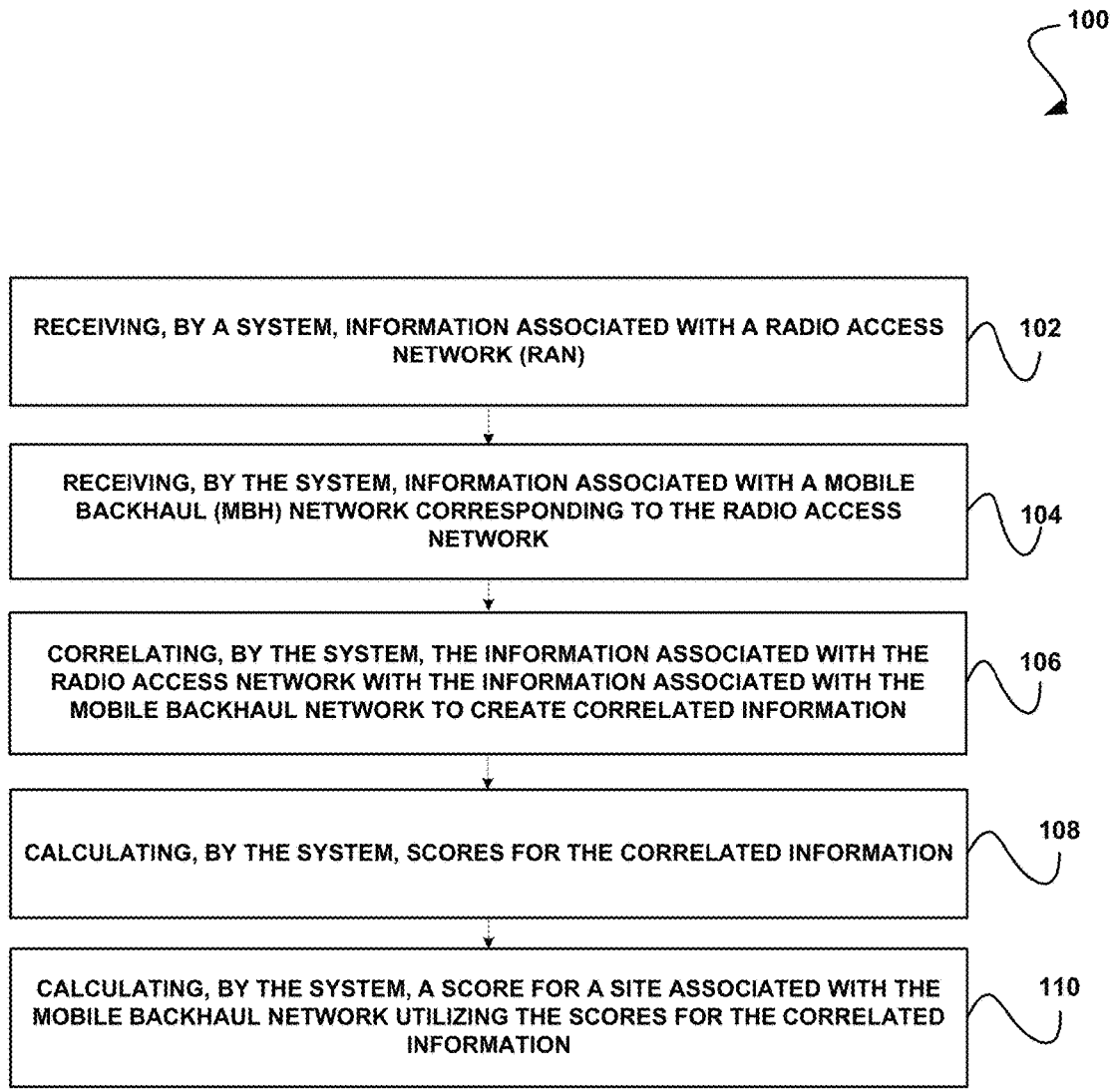
FIG. 1 illustrates a method for utilizing radio access network (RAN) information and mobile backhaul (MBH) network information to assess network site performance, in accordance with one embodiment.

FIG. 1 illustrates a method 100 for utilizing radio access network (RAN) information and mobile backhaul (MBH) network information to assess network site performance, in accordance with one embodiment.

In operation, a system receives information associated with a radio access network (RAN). See operation 102. Additionally, the system receives information associated with a mobile backhaul (MBH) network corresponding to the radio access network. See operation 104.

The information associated with the radio access network and the mobile backhaul network may include any type of information. For example, the information associated with the radio access network may include key performance indicators (KPIs), such as accessibility, retainability, and throughput, etc. The information associated with the backhaul network may include key performance indicators, such as packet loss, delay, jitter, and round-time delay, etc.

In one embodiment, the information associated with the mobile backhaul network may be received as measurements provided by a Two-Way Active Measurement Protocol (TWAMP) generator that sends synthetic traffic across the mobile backhaul network in order to measure its quality. For example, the TWAMP measurements may include packet loss, delay, jitter and round-time delay, etc. In one embodiment, the TWAMP generator may be part of the system implementing the method of FIG. 1.

The system correlates the information associated with the radio access network with the information associated with the mobile backhaul network to create correlated information. See operation 106. In this case, correlating the information associated with the radio access network with the information associated with the mobile backhaul network to create the correlated information may include correlating each of the plurality of key performance indicators associated with the radio access network with one or more of the plurality of key performance indicators associated with the mobile backhaul network to generate correlated key performance indicators.

Further, the system calculates scores for the correlated information. See operation 108. Calculating the scores for the correlated information may include calculating scores for each of the correlated key performance indicators.

In various embodiments, the scores may be a calculated utilizing a variety of techniques. One example of calculating scores for the correlated information is described in the context of FIG. 3. Additionally, in various embodiments, the scores may include numerical scores, letter scores, score categorizations (e.g. character strings, etc.).

Moreover, the system calculates a score for a site associated with the mobile backhaul network and the RAN utilizing the scores for the correlated information. See operation 110.

In various embodiments, the site score may be a calculated utilizing a variety of techniques. One example of calculating site scores is described in the context of FIG. 3. In one embodiment, there may be three main site scoring categories including accessibility, retainability, and throughput. In various embodiments, the site scores may include numerical scores, letter scores, score categorizations (e.g. character strings, etc.).

Once the site score is calculated, the system may rank the site among a plurality of sites based on the score for the site. Further, in one embodiment, the system may select or identify one or more of the plurality of sites based on rankings of the sites for generating steps for fixing potential issues associated with the sites (i.e. for performing triage, etc.).

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
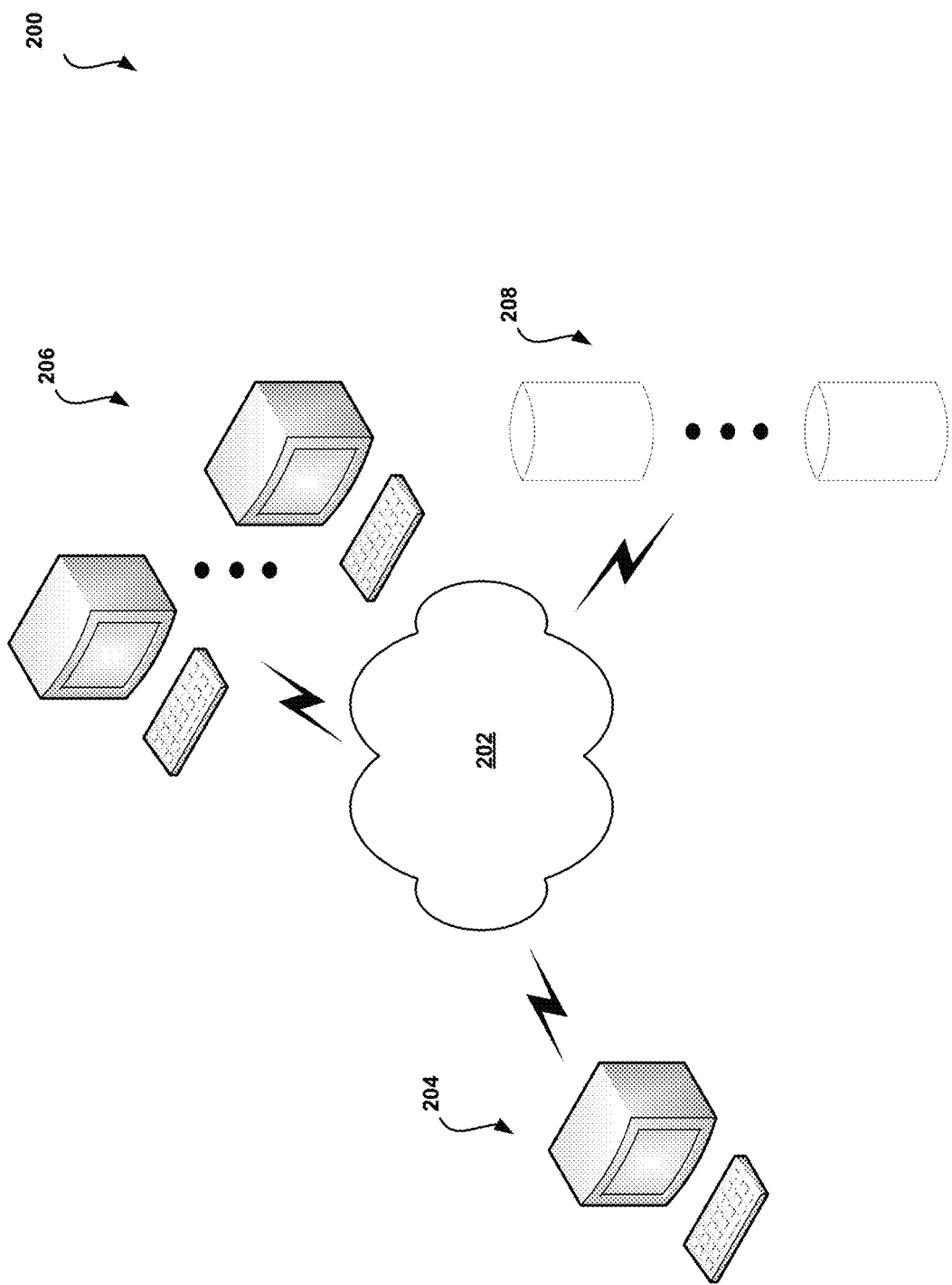
FIG. 2 shows a system for utilizing radio access network information and mobile backhaul network information to assess network site performance, in accordance with one embodiment.

FIG. 2 shows a system 200 for utilizing radio access network information and mobile backhaul network information to assess network site performance, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a scoring system 204, which may implement a variety of applications or software, etc. The scoring system 204 may be capable of communicating with a plurality of systems 206, either directly or over one or more networks 202, for accessing radio access network information and mobile backhaul network information for analysis.

The scoring system 204 may also be in communication with one or more repositories/databases 208, which may serve as storage areas for radio access network information and mobile backhaul network information, such as key performance indicators, etc.

Service providers have experienced an exponential growth in mobile packet data traffic in the last decade, especially since the deployment of LTE and LTE-A. While radio access networks adopt new technologies such as 4G and 5G and scales to deliver the ever-increasing capacity and throughput demand, service providers cannot afford to allow the mobile backhaul (MBH) network to fall behind.

In a cellular network, the radio access network performance is often impacted due to degradations in the mobile backhaul network, which impacts the overall end user experience. Mobile backhaul issues such as packet losses, excessive delay and jitter have a direct impact on multiple radio access network key performance indicators (KPIs) including network accessibility, retainability, and throughput. A quick identification and resolution of mobile backhaul issues can ensure minimal service impact and make it possible to prevent severe impacts to end user experiences.

The scoring system 204 enables service providers that have radio access networks and mobile backhaul networks to quickly identify whether an issue is across the radio access network or mobile backhaul network domains, to prioritize mobile backhaul network optimization tasks that have the greatest impact on subscribers' Quality of Experience (QoE), and to cross the silos between radio access networks to mobile backhaul networks.

This scoring system 204 establishes a direct correlation between backhaul issues and RAN performance degradation. In one embodiment, this correlation may be achieved based on site score logic, which takes into account a few important parameters and counters from the RAN and mobile backhaul. With the help of site score logic, a network level top offender list can be identified by the scoring system 204 and sites can be ranked on the basis of severity of RAN performance degradation due to backhaul issues.

In order to calculate the sites scores, a set of mobile backhaul measurements may be taken. In one embodiment, these measurements may be provided by a TWAMP generator that sends synthetic traffic across the mobile backhaul network in order to measure its quality. In one embodiment, the TWAMP measurements may include packet loss, delay, jitter and round-time delay.

Once the mobile backhaul measurements are available they are correlated with RAN KPIs and the site scoring is calculated by the scoring system 204. The purpose of the site scoring is to identify the top issues in the mobile backhaul that are diminishing the RAN performance and therefore the end user quality of experience. In one embodiment, there may be three main site scoring categories including accessibility, retainability, and throughput.

Figure 3:
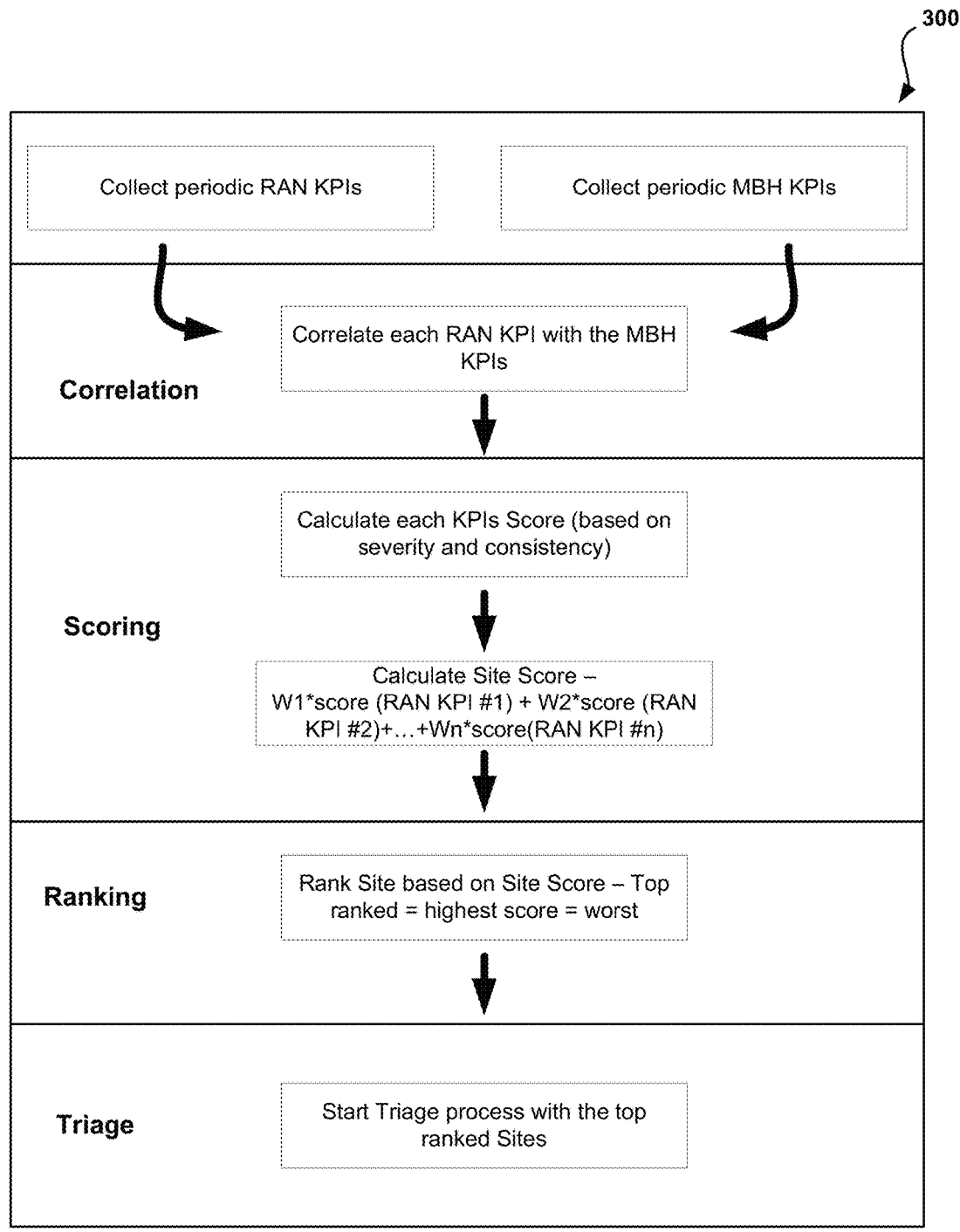
FIG. 3 shows a system flow diagram for performing site scoring calculation, in accordance with one embodiment.

FIG. 3 shows a system flow diagram 300 for performing site scoring calculation, in accordance with one embodiment. As an option, the system flow diagram 300 may be viewed in the context of the details of the previous figures and/or any subsequent figure(s). Of course, however, the system flow diagram 300 may be viewed in the context of any desired environment. Further, the aforementioned definitions may equally apply to the description below.

As shown, in one embodiment, a score may be calculated for each site based on the impact of the mobile backhaul issues on the RAN KPIs. The higher the score, the greater the impact of mobile backhaul issues on the RAN performance. For each RAN KPI, the scoring system calculates the impact of mobile backhaul performance degradation on the site and the system gives a score to the site.

As an example, there may be two sites (site A and site B) that both suffer from packet loss in the mobile backhaul network. When mobile backhaul packet loss in site A increases from 0.1% to 1%, the RAN site throughput may drop from 30 Mbps to 20 Mbps. In site B, a similar increase in mobile backhaul packet loss may lead to a throughput drop from 30 Mbps to 10 Mbps. In addition, site B may suffer from longer durations of packet drops compared to site A. It is clear that the impact of mobile backhaul packet loss on site B is greater than the impact on site A. Therefore, the site scoring for site B is higher than the scoring of site A.

Similar calculations to the one in this example may be performed by the system for each one of the RAN KPIs, and based on the score of each KPI, the combined site score may be calculated as follows: Combined Site Score=$W1*$score (RAN KPI #1)+$W2*$score (RAN KPI #2)+ . . . +$W\_n*$score (RAN KPI #n), where W1, W2 . . . W_n are the respective weightage assigned to respective KPI, and $W1+W2+ \ldots +W\_n=1$.

Table 1 shows an example for a site score formula, in accordance with one embodiment.

TABLE 1

Formula = (100*[Bad Hours/24]) *(100*[sum (RAN Transport Failure)/max (RAN Transport Failure)])/100
Where:
Bad Hours = Number of Hours where RAN Transport Failures and Backhaul Packet Losses > 0
Backhaul Packet Losses = Sum of losses in the transport network identified from active probes/Actuators
RAN Transport Failure = Sum of Transport failure counters in accessibility/retainability KPIs Table 2 shows an example for a site score logic for signaling, in accordance with one embodiment.

TABLE 2

Formula = (100*[#Bad Hours (signalling)/24]) *(100*sum (RAN Transport Failure (Signalling))/max (RAN Transport Failure (Signalling))/100

Table 3 shows an example for a site score logic for signaling, in accordance with one embodiment. Excessive delay and RTT (latency) has a direct impact on throughput. This correlation provides the impact of backhaul packet delay on throughput KPI. The higher the value, the higher the impact would be.

TABLE 3

Formula = {(100*/Delay /MAX (Delay)]) *(100.1 − 100*[(DL Throughput)/max (DL Throughput (After offender filtration))])}/100
Alternate formula = {{(w1*/Delay /MAX (Delay)]) + w2*(100.1 − 100*[(DL Throughput)/max (DL Throughput (After offender filtration))])}
Where, w1 and w2 are weightage and w1+w2 = 1
Delay = Average Mean one way delay, in case an active probe provides RTT then Delay can be replaced with RTT value
DL Throughput =DL Average PDCP Throughput Once a site score is calculated for each site, it may be represented in the system along with other KPIs of the site (e.g. such as RAN and MBH raw measurements). The system makes it easier to identify the impact of MBH on RAN, to prioritize issues in the MBH that impact the RAN and to fix them.

Figure 4:
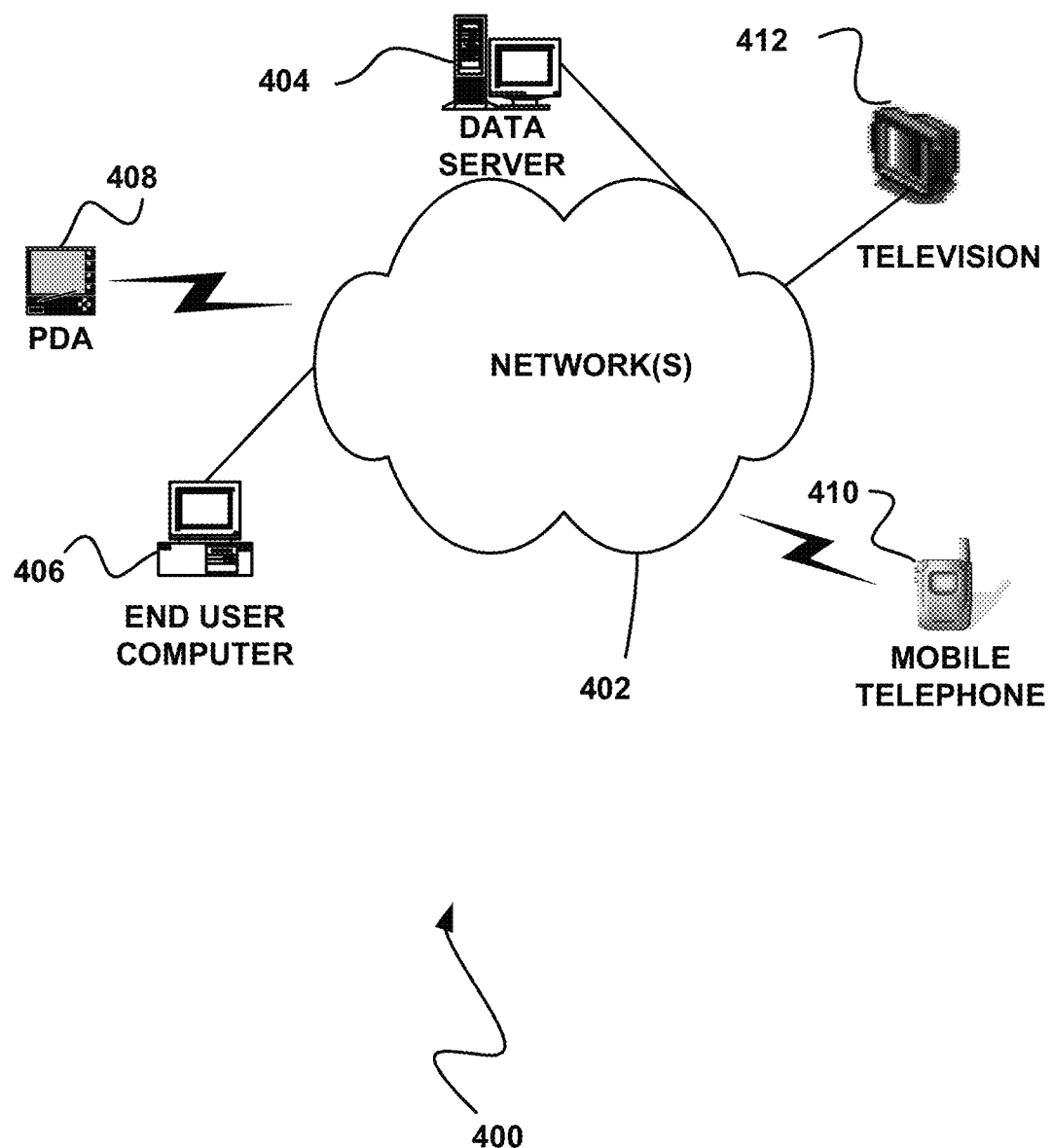
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
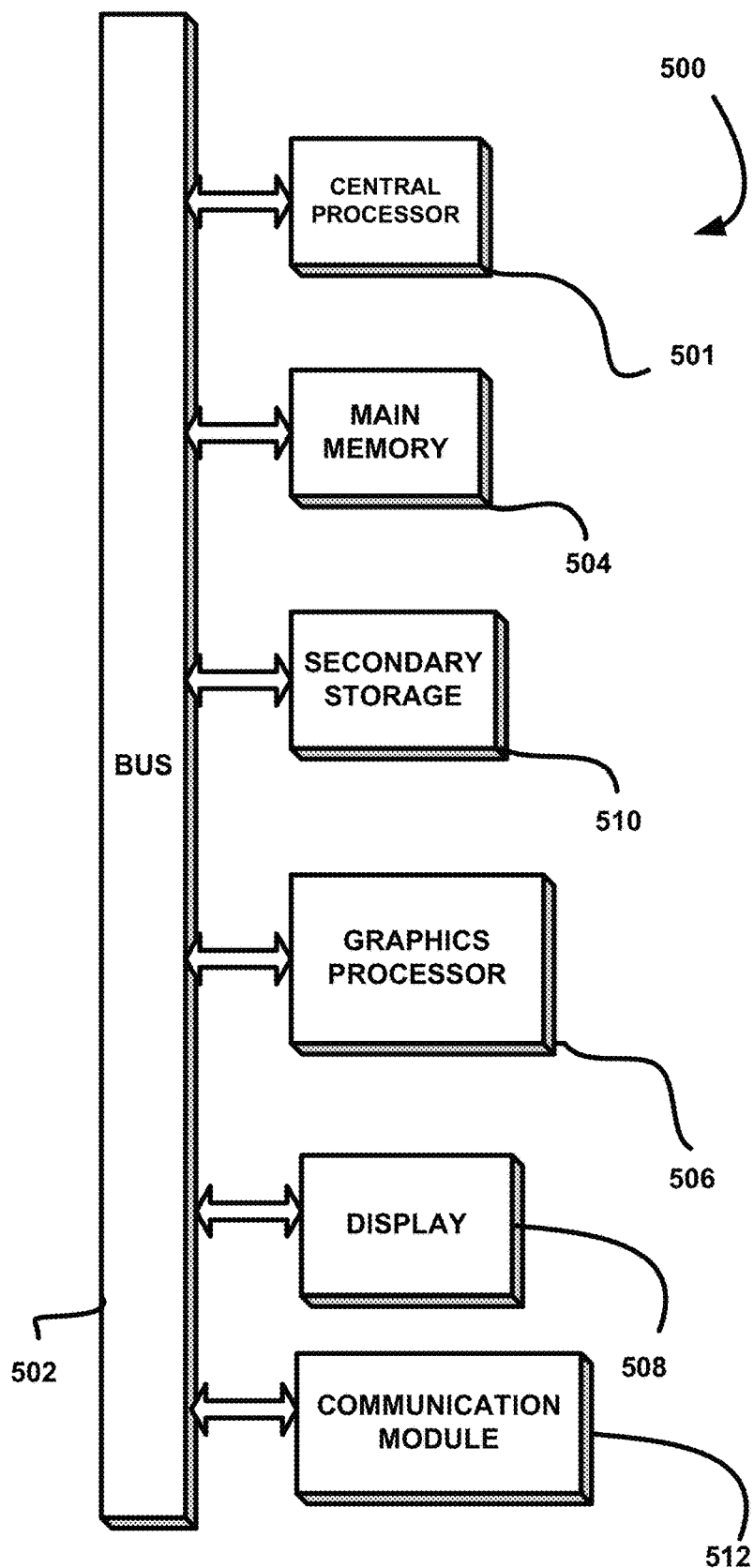
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a system, performance information for each radio access network (RAN) of a plurality of radio access networks (RANs), each radio access network of the plurality of radio access networks corresponding to a different site of a plurality of sites, and the performance information associated with each radio access network of the plurality of radio access networks including key performance indicators (KPIs) for accessibility, retainability, and throughput;
   receiving, by the system, performance information for each mobile backhaul (MBH) network of a plurality of mobile backhaul networks, each mobile backhaul network of the plurality of mobile backhaul networks corresponding to one of the radio access networks of the plurality of radio access networks, the performance information associated with each mobile backhaul network of the plurality of mobile backhaul networks including mobile backhaul measurements provided by a Two-Way Active Measurement Protocol (TWAMP) that sends synthetic traffic across each mobile backhaul network of the plurality of mobile backhaul networks in order to measure packet loss, delay, jitter and round-time delay for each mobile backhaul network of the plurality of mobile backhaul networks;
   for each radio access network of the plurality of radio access networks:
     correlating, by the system, the performance information received for the radio access network of the plurality of radio access networks with the performance information received for a corresponding mobile backhaul network of the plurality of mobile backhaul networks to create correlated information for the radio access network of the plurality of radio access networks, and
     calculating, by the system, a score for the correlated performance information, the score indicating an impact of a performance of the corresponding mobile backhaul network of the plurality of mobile backhaul networks on a performance of the radio access network of the plurality of radio access networks; and
   ranking, by the system, the sites based on the scores for use in prioritizing optimization tasks to a top ranked one of the sites.

2. The method of claim 1, further comprising selecting, by the system, one or more of the sites based on the ranking for generating steps for fixing potential issues associated with the selected one or more of the sites.

3. The method of claim 1, wherein the performance information associated with each mobile backhaul network of the plurality of mobile backhaul networks includes a plurality of key performance indicators (KPIs) associated with each mobile backhaul network of the plurality of mobile backhaul networks.

4. The method of claim 3, wherein correlating the performance information received for the radio access network of the plurality of radio access networks with the performance information received for a corresponding mobile backhaul network of the plurality of mobile backhaul networks to create the correlated information includes correlating each of the plurality of key performance indicators received for the radio access network of the plurality of radio access networks with one or more of the plurality of key performance indicators received for the corresponding mobile backhaul network to generate correlated key performance indicators.

5. The method of claim 4, wherein calculating the score for the correlated performance information includes calculating scores for each of the correlated key performance indicators.

6. The method of claim 1, wherein the scores indicate a direct correlation between issues with the MBH networks and RAN performance degradation, and wherein the sites are ranked based on the scores such that the sites are ranked on the basis of severity of the RAN performance degradation due to the issues with the MBH networks.

7. The method of claim 1, wherein ranking, by the system, the sites based on the scores for use in prioritizing optimization tasks to a top ranked one of the sites includes ranking the sites based on the scores for use in prioritizing one or more optimization tasks for one or more of the plurality of mobile backhaul networks that have a greatest impact on quality of experience (QoE) for subscribers.

8. The method of claim 1, wherein calculating a score for the correlated performance information includes summing sub-scores calculated for each of the KPIs, wherein each of the sub-scores is weighted.

9. A computer program product embodied on a non-transitory computer readable medium, comprising computer code for:
  receiving, by a system, performance information for each radio access network (RAN) of a plurality of radio access networks (RANs), each radio access network of the plurality of radio access networks corresponding to a different site of a plurality of sites, and the performance information associated with each radio access network of the plurality of radio access networks including key performance indicators (KPIs) for accessibility, retainability, and throughput;
  receiving, by the system, performance information for each mobile backhaul (MBH) network of a plurality of mobile backhaul networks, each mobile backhaul network of the plurality of mobile backhaul networks corresponding to one of the radio access networks of the plurality of radio access networks, the performance information associated with each mobile backhaul network of the plurality of mobile backhaul networks including mobile backhaul measurements provided by a Two-Way Active Measurement Protocol (TWAMP) that sends synthetic traffic across each mobile backhaul network of the plurality of mobile backhaul networks in order to measure packet loss, delay, jitter and round-time delay for each mobile backhaul network of the plurality of mobile backhaul networks;
  for each radio access network of the plurality of radio access networks:
    correlating, by the system, the performance information received for the radio access network of the plurality of radio access networks with the performance information received for a corresponding mobile backhaul network of the plurality of mobile backhaul networks to create correlated information for the radio access network of the plurality of radio access networks, and
    calculating, by the system, a score for the correlated performance information, the score indicating an impact of a performance of the corresponding mobile backhaul network of the plurality of mobile backhaul networks on a performance of the radio access network of the plurality of radio access networks; and
  ranking, by the system, the sites based on the scores for use in prioritizing optimization tasks to a top ranked one of the sites.

10. The computer program product of claim 9, further comprising computer code for selecting, by the system, one or more of the sites based on the ranking for generating steps for fixing potential issues associated with the selected one or more of the sites.

11. The computer program product of claim 9, wherein the performance information associated with each mobile backhaul network of the plurality of mobile backhaul networks includes a plurality of key performance indicators (KPIs) associated with each mobile backhaul network of the plurality of mobile backhaul networks.

12. The computer program product of claim 11, wherein correlating the performance information received for the radio access network of the plurality of radio access networks with the performance information received for a corresponding mobile backhaul network of the plurality of mobile backhaul networks to create the correlated information includes correlating each of the plurality of key performance indicators received for the radio access network of the plurality of radio access networks with one or more of the plurality of key performance indicators received for the corresponding mobile backhaul network to generate correlated key performance indicators.

13. The computer program product of claim 12, wherein calculating the score for the correlated performance information includes calculating scores for each of the correlated key performance indicators.

14. A system, comprising one or more processors, operable for:
  receiving, by the system, performance information for each radio access network (RAN) of a plurality of radio access networks (RANs), each radio access network of the plurality of radio access networks corresponding to a different site of a plurality of sites, and the performance information associated with each radio access network of the plurality of radio access networks including key performance indicators (KPIs) for accessibility, retainability, and throughput;
  receiving, by the system, performance information for each mobile backhaul (MBH) network of a plurality of mobile backhaul networks, each mobile backhaul network of the plurality of mobile backhaul networks corresponding to one of the radio access networks of the plurality of radio access networks, the performance information associated with each mobile backhaul network of the plurality of mobile backhaul networks including mobile backhaul measurements provided by a Two-Way Active Measurement Protocol (TWAMP) that sends synthetic traffic across each mobile backhaul network of the plurality of mobile backhaul networks in order to measure packet loss, delay, jitter and round-time delay for each mobile backhaul network of the plurality of mobile backhaul networks;

for each radio access network of the plurality of radio access networks:

correlating, by the system, the performance information received for the radio access network of the plurality of radio access networks with the performance information received for a corresponding mobile backhaul network of the plurality of mobile backhaul networks to create correlated information for the radio access network of the plurality of radio access networks, and calculating, by the system, a score for the correlated performance information, the score indicating an impact of a performance of the corresponding mobile backhaul network of the plurality of mobile backhaul networks on a performance of the radio access network of the plurality of radio access networks; and ranking, by the system, the sites based on the scores for use in prioritizing optimization tasks to a top ranked one of the sites.

15. The system of claim 14, wherein the system is further operable for selecting, by the system, one or more of the sites based on the ranking for generating steps for fixing potential issues associated with the selected one or more of the sites.

16. The system of claim 14, wherein the performance information associated with each mobile backhaul network of the plurality of mobile backhaul networks includes a plurality of key performance indicators (KPIs) associated with each mobile backhaul network of the plurality of mobile backhaul networks.

17. The system of claim 16, wherein correlating the performance information received for the radio access network of the plurality of radio access networks with the performance information received for a corresponding mobile backhaul network of the plurality of mobile backhaul networks to create the correlated information includes correlating each of the plurality of key performance indicators received for the radio access network of the plurality of radio access networks with one or more of the plurality of key performance indicators received for the corresponding mobile backhaul network to generate correlated key performance indicators.

* * * * *